United States Patent
Nakazato et al.

(10) Patent No.: US 10,003,593 B2
(45) Date of Patent: Jun. 19, 2018

(54) AUTHENTICATION APPARATUS, AUTHENTICATION METHOD, AND AUTHENTICATION SYSTEM

(71) Applicant: KYOCERA Document Solutions Inc., Osaka (JP)

(72) Inventors: Yosuke Nakazato, Osaka (JP); Makoto Kowaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 139 days.

(21) Appl. No.: 15/094,972

(22) Filed: Apr. 8, 2016

(65) Prior Publication Data

US 2016/0301681 A1 Oct. 13, 2016

(30) Foreign Application Priority Data

Apr. 8, 2015 (JP) .................................. 2015-079357

(51) Int. Cl.
  *H04L 29/06* (2006.01)
  *G06F 21/31* (2013.01)
  *G06F 21/35* (2013.01)
(52) U.S. Cl.
  CPC ............ *H04L 63/083* (2013.01); *G06F 21/31* (2013.01); *G06F 21/35* (2013.01)
(58) Field of Classification Search
  CPC ......... H04L 63/083; G06F 21/31; G06F 21/35

(Continued)

(56) References Cited

U.S. PATENT DOCUMENTS 6,209,104 B1 * 3/2001 Jalili .................. G06F 21/36
  340/5.8
8,255,696 B2 * 8/2012 Florencio ............ G06F 21/46
  705/64

(Continued)

FOREIGN PATENT DOCUMENTS

JP 2006-301684 A 11/2006
JP 2007-164656 A 6/2007

(Continued)

*Primary Examiner* — Eleni A Shiferaw
*Assistant Examiner* — Shahriar Zarrineh
(74) *Attorney, Agent, or Firm* — Hawaii Patent Services; Nathaniel K. Fedde; Kenton N. Fedde (57) ABSTRACT

Provided is an authentication apparatus easily realizing a one-time password system ensuring the security of a password without new equipment. The apparatus includes a user information registration processing circuit and a user authentication processing circuit. The user information registration processing circuit registers user identification information, reference identification information constituting a reference, and a selection sequenced identification indicator string having selection identification indicators selected from identification indicators and a sequence of these indicators for each user. The user authentication processing circuit executes a user authentication using a password determined by calculating the positions of the selection identification indicators of the selection sequenced identification indicator string from the position of an identification indicator of a random identification indicator string where the identification indicators are arranged at random that corresponds to the reference identification information into the sequence of the selection identification indicators and the user identification information.

7 Claims, 6 Drawing Sheets

(58) Field of Classification Search
USPC .......................................................... 726/5
See application file for complete search history.

(56) References Cited

U.S. PATENT DOCUMENTS

| | | | | |
|---|---|---|---|---|
| 8,572,684 B1* | 10/2013 | Sama | .................. | H04L 63/0838 726/2 |
| 9,004,365 B2* | 4/2015 | Bona | ...................... | G06K 19/06 235/487 |
| 9,514,304 B2* | 12/2016 | Corrion | .................. | G06F 21/31 |
| 9,606,983 B1* | 3/2017 | McClintock | ........ | G06F 17/2735 |
| 2003/0101342 A1* | 5/2003 | Hansen | .................. | G06F 21/35 713/167 |
| 2004/0049685 A1* | 3/2004 | Jaloveczki | ............. | G06F 21/36 713/182 |
| 2004/0172562 A1* | 9/2004 | Berger | ................. | G06F 21/316 726/7 |
| 2006/0018467 A1* | 1/2006 | Steinmetz | ............... | G06F 21/34 380/54 |
| 2007/0113294 A1* | 5/2007 | Field | .................... | H04L 63/083 726/27 |
| 2008/0060061 A1* | 3/2008 | Deshpande | ......... | H04L 63/0823 726/5 |
| 2008/0267195 A1* | 10/2008 | Belmon | .................. | H04L 12/46 370/401 |
| 2009/0006941 A1* | 1/2009 | Yoshida | ................ | G06F 3/0236 715/227 |
| 2009/0037986 A1* | 2/2009 | Baker | .................... | G06F 21/31 726/5 |
| 2009/0249447 A1* | 10/2009 | Ogawa | .................... | G06F 21/36 726/4 |
| 2010/0017875 A1* | 1/2010 | Hirakawa | ............... | G06F 21/36 726/19 |
| 2012/0023428 A1* | 1/2012 | Kennard | ........... | G05D 23/1917 715/771 |
| 2012/0322461 A1* | 12/2012 | Ito | .......................... | G06F 21/35 455/456.1 |
| 2013/0047236 A1* | 2/2013 | Singh | ..................... | G06F 21/36 726/7 |
| 2013/0047238 A1* | 2/2013 | Hwang | ................. | H04L 9/3228 726/7 |
| 2013/0139248 A1* | 5/2013 | Rhee | ..................... | G06F 3/0346 726/19 |
| 2013/0276099 A1* | 10/2013 | Hoareau | ................. | G06F 21/36 726/18 |
| 2014/0118766 A1* | 5/2014 | Kang | .................... | G06F 3/1207 358/1.13 |
| 2014/0123274 A1* | 5/2014 | Chen | ....................... | G06F 21/46 726/18 |
| 2014/0315519 A1* | 10/2014 | Nielsen | ................ | H04W 12/06 455/411 |
| 2014/0344923 A1* | 11/2014 | Wang | .................... | G06F 21/36 726/19 |
| 2015/0101040 A1* | 4/2015 | Hayashi | ................ | G06F 21/31 726/19 |
| 2015/0205942 A1* | 7/2015 | Yang | ....................... | G06F 21/31 726/19 |
| 2015/0281215 A1* | 10/2015 | Zia | ........................ | H04L 63/083 726/7 |
| 2015/0309724 A1* | 10/2015 | Wu | ..................... | G06F 3/04886 715/773 |
| 2015/0378842 A1* | 12/2015 | Tomlinson | .............. | G06F 21/40 380/28 |
| 2015/0379260 A1* | 12/2015 | Hwang | ............... | H04L 63/0838 726/6 |
| 2016/0070901 A1* | 3/2016 | Kim | ....................... | G06F 21/34 726/19 |
| 2016/0092877 A1* | 3/2016 | Chew | ................. | G06Q 20/4012 705/72 |
| 2016/0164681 A1* | 6/2016 | Jiang | ..................... | H04L 9/3226 713/183 |
| 2016/0241556 A1* | 8/2016 | Jakobsson | ............... | G06F 21/36 |
| 2017/0126690 A1* | 5/2017 | Ogawa | .................... | H04L 63/102 |

FOREIGN PATENT DOCUMENTS

| | | | | |
|---|---|---|---|---|
| JP | 2009-289030 A | 12/2009 | | |
| KR | 101519301 B1 * | 5/2015 | ............. | G06F 21/31 |
| WO | WO-2014181952 A1 * | 11/2014 | ............. | G06F 21/34 |

* cited by examiner

FIG.1

FIG.6 password setting screen 312

312a input password 240  312b third position from the left ( ♪ ) : reference position ☆ → ● → ♪ : selection sequenced symbol ☆ : second position from reference position ● : fourth position from reference position ♪ : 0th position from reference position

AUTHENTICATION APPARATUS, AUTHENTICATION METHOD, AND AUTHENTICATION SYSTEM

INCORPORATION BY REFERENCE

This application is based on and claims the benefit of priority from Japanese Patent Application No. 2015-079357 filed on Apr. 8, 2015, the entire contents of which are hereby incorporated by reference.

BACKGROUND

This disclosure relates to an authentication apparatus configured to attest to the authenticity of a user, an authentication method and an authentication system.

The propagation of the internet enables shopping and fund transfer using the internet. Because of this, in order to prevent the execution of fraud shopping or fund transfer by a fraudster, a user authentication is carried out. In a typical user authentication using a password, there is a case where the password leaks through surreptitious glance or wire tapping, which enables a person like a fraudster who gets the password surreptitiously to easily be the proper user. To deal with this, a disposable password (hereinafter, referred to as a "one time password" is used. For example, in a typical user authentication method, different random symbols are generated into a matrix every time the user attempts to do some internet shopping or fund transfer, and the user reads out sequentially the random symbols in the matrix according to a one time password pattern that is defined by the user, whereby the user can use the string of symbols so read out as the one time password.

SUMMARY

According to an aspect of this disclosure, an authentication apparatus includes a user information registration processing circuit and a user authentication processing circuit. The user information registration processing circuit registers, for each user, user identification information, reference identification information that constitutes a reference, and a selection sequenced identification indicator string having a plurality of selection identification indicators that are selected from a plurality of identification indicators and a sequence of the selection identification indicators. The user authentication processing circuit executes a user authentication by the use of a password and the user identification information. The password is determined by calculating the positions of the selection identification indicators of the selection sequenced identification indicator string from the position of an identification indicator of a random identification indicator string in which the plurality of identification indicators are arranged at random that corresponds to the reference identification information into the sequence of the selection identification indicators.

An authentication method according to another aspect of this disclosure includes registering, for each user, user identification information, reference identification information that constitutes a reference, and a selection sequenced identification indicator string having a plurality of selection identification indicators that are selected from a plurality of identification indicators and a sequence of the selection identification indicators. Then, the authentication method further includes executing a user authentication by the use of a password and the user identification information. The password is determined by calculating the positions of the selection identification indicators of the selection sequenced identification indicator string from the position of an identification indicator of a random identification indicator string in which the plurality of identification indicators are arranged at random that corresponds to the reference identification information into the sequence of the selection identification indicators.

An authentication system according to a further aspect of the disclosure has an authentication apparatus, an image forming apparatus and a terminal apparatus that are connected together via a network. The authentication apparatus includes a user information registration processing circuit and a user authentication processing circuit. The user information registration processing circuit registers, for each user, user identification information, reference identification information that constitutes a reference, and a selection sequenced identification indicator string having a plurality of selection identification indicators that are selected from a plurality of identification indicators and a sequence of the selection identification indicators. The user authentication processing circuit executes a user authentication by the use of a password and the user identification information. The password is determined by calculating the positions of the selection identification indicators of the selection sequenced identification indicator string from the position of an identification indicator of a random identification indicator string in which the plurality of identification indicators are arranged at random that corresponds to the reference identification information into the sequence of the selection identification indicators and the user identification information. When the image forming apparatus is operated from the terminal apparatus, the user authentication processing circuit of the authentication apparatus executes a user authentication by the use of the user identification information that is inputted from the terminal apparatus.

DETAILED DESCRIPTION

Hereinafter, a first embodiment (hereinafter, referred to as Embodiment 1) for carrying out the disclosure will be described by reference to the drawings. In Embodiment 1, when a job execution requirement is given from a mobile terminal to an image forming apparatus, an authentication apparatus executes a user authentication using a password. Then, when the user is verified as a proper user, the image forming apparatus executes the required job.

Figure 1:
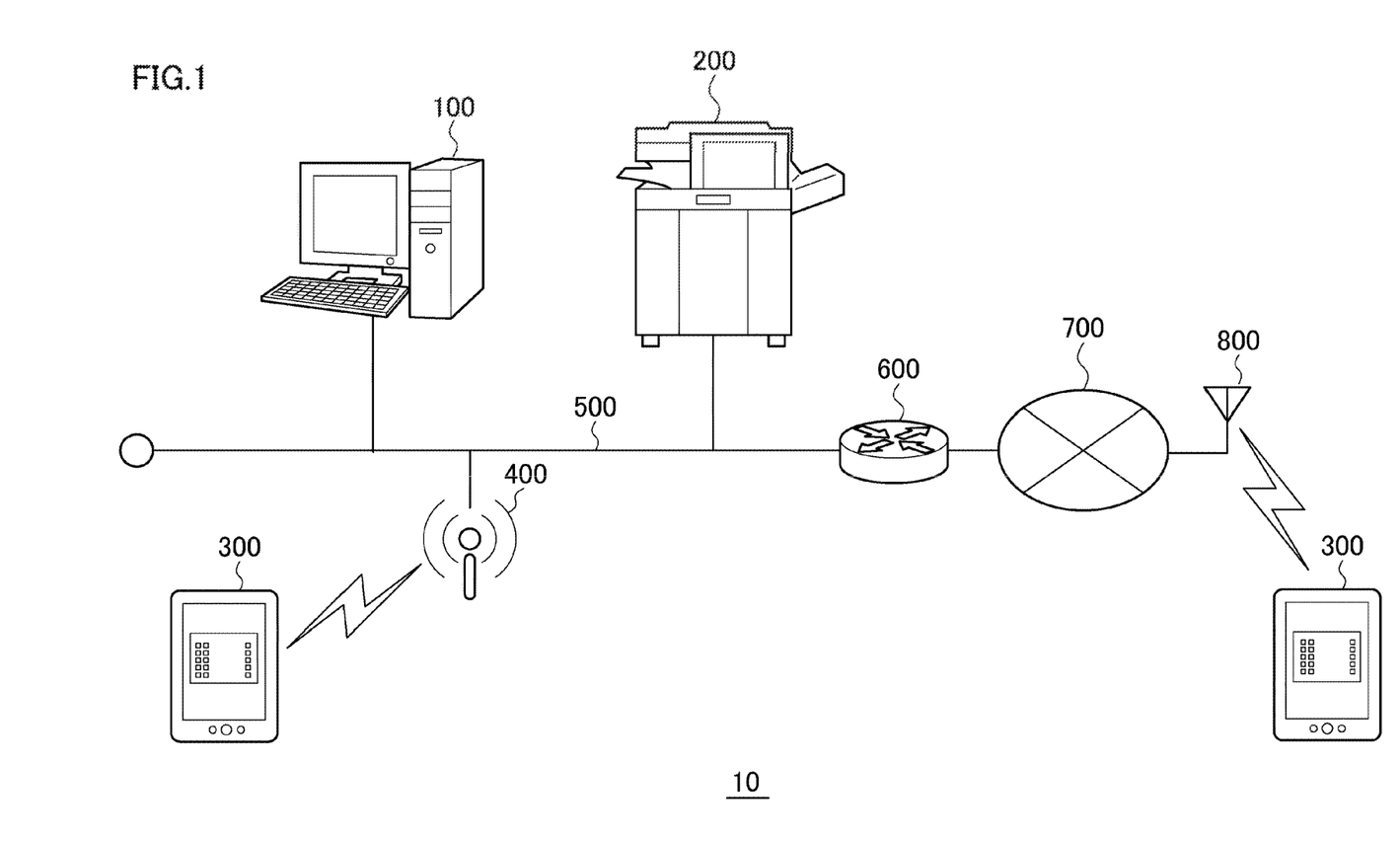
FIG. 1 shows the configuration of an authentication system according to Embodiment 1 of this disclosure.

Firstly, the configuration of an authentication system 10 employing an authentication apparatus 100 of Embodiment 1 will be described using FIG. 1. As shown in FIG. 1, the authentication system includes the authentication apparatus 100, an image forming apparatus 200, a mobile terminal 300, an access point 400, a network 500, a router 600, an internet 700, and an access point 800. The authentication apparatus 100, the image forming apparatus 200, and the access point 400 are connected to the network 500. The network 500 is connected to the internet 700 by way of the router 600.

The authentication apparatus 100 is a server that attests to the authenticity of a user through a user ID (user identification information) and a password. The authentication apparatus 100 can receive and transmit data from and to the image forming apparatus 200 and the mobile terminal 300.

The image forming apparatus 200 is a multifunction printer, a multifunction peripheral apparatus or multifunction equipment. The image forming apparatus 200 can receive and transmit data from and to the authentication apparatus 100 and the mobile terminal 300.

The mobile terminal 300 is a mobile telephone, a smart phone or a tablet terminal. The mobile terminal 300 can receive and transmit data from and to the authentication apparatus 100 and the image forming apparatus 200 via the access point 400 of the network 500 or the access point 800 of the internet 700.

The access point 400 is connected to the network 500 and connects the mobile terminal 300 to the network 500 when the mobile terminal 300 request a connection with the access point 400 through wireless communication.

The network 500 is a network (an intranet) such as a LAN (Local Area Network). Connected to the network 500 are the authentication apparatus 100, the image forming apparatus 200, the access point 400 and the router 600.

The router 600 is connected to the network 500, whereby the network 500 is connected to the internet 700.

The internet 700 is an IP network such as the internet and an intranet. The mobile terminal 300 is connected to the internet 700 by way of the access point 800.

Figure 2:
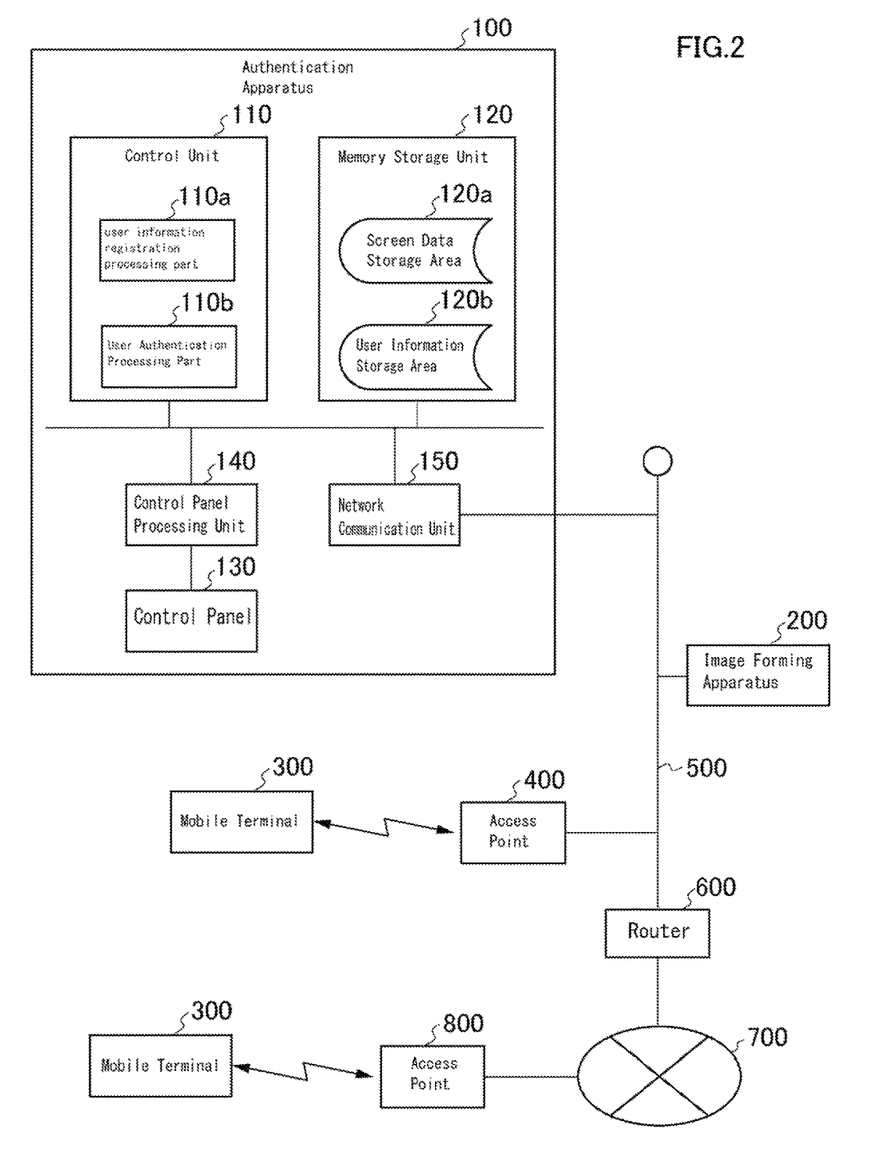
FIG. 2 shows the configuration of an authentication apparatus shown in FIG. 1.

Nest, a functional configuration of the authentication apparatus 100 of the authentication system 10 will be described by the use of FIG. 2. The authentication apparatus 100 shown in FIG. 2 includes a control unit 110, a memory unit 120, a control panel 130, a control panel operation unit 140 and a network communication unit 150. These constituent units are configured to be connected together by a bus. The control unit 110 includes a user information registration processing part 110*a* and a user authentication processing part 110*b*. The memory unit 120 includes a screen data storage area 120*a* and a user information storage area 120*b*.

The control unit 110 includes a main storage unit such as a RAM and a ROM, and a control unit such as a CPU (Central Processing Unit). The control unit 110 executes a general control of the authentication apparatus 100 including various inputs and outputs, an interface such as a USB (a universal serial bus) and a bus controller. The user information registration processing part 110*a* and the user authentication processing part 110*b* have a processor such as a central processing unit (CPU) having one or a plurality of circuitries and can read and execute various types of programs. These parts can also execute various programs that are incorporated therein in advance. Here, the circuitries can be electronic components or electronic circuit boards in which a plurality of electronic elements is connected together by wiring.

The user information registration processing part 110*a* stores, for each user, a user ID that is registered from the mobile terminal 300, a single symbol as identification information that only the user can memorize by determining it by the user himself or herself (hereinafter, referred to as a "reference symbol"), and a selection symbol string including a plurality of selection symbols selected from a plurality of symbols and a sequence of the selection symbols (hereinafter, referred to as a "symbol string in selection sequence" or "selection sequenced symbol string) in the user information storage area 120*b*. The user ID, the reference symbol and the selection sequenced symbol string may be registered from the image forming apparatus 200.

The user authentication processing part 110*b* executes a user authentication based on the registered ID, the reference symbol, the selection sequenced symbol string and a password that the user sets from the mobile terminal 300. A user authentication operation or process that is executed by the user authentication processing part 110*b* will be described in detail later.

The memory unit 120 is an auxiliary storage unit such as a flash memory and stores data on a processing program that is executed by the control unit 110. The memory unit 120 includes the screen data storage area 120*a* and the user information storage area 120*b*.

The screen data storage area 120*a* stores a format of a screen to be displayed on the control panel 130 and a format of a screen to be displayed on the mobile terminal 300, display data and control data. The screen data storage area 120*a* stores data for displaying and controlling a user ID input screen 311, a password setting screen 312 and a user authentication error notification screen 313, and these screens will be described later.

The user information storage area 120*b* stores the user ID that is registered from the user information registration processing part 110*a*, the reference symbol and the selection sequenced symbol string.

The control panel 130 is a liquid crystal panel that displays a control screen where to control functions that the authentication apparatus 100 includes and receives a control to be executed by the user and doubles as a display circuit and a control circuit.

The control panel operation unit 140 is a processor exclusive to the control panel 130 and performs a process of displaying a control screen on the display panel 130 and a process of inputting a control from the control panel 130.

The network communication unit 150 includes a detachable LAN interface and connects to the network 500.

Figure 3:
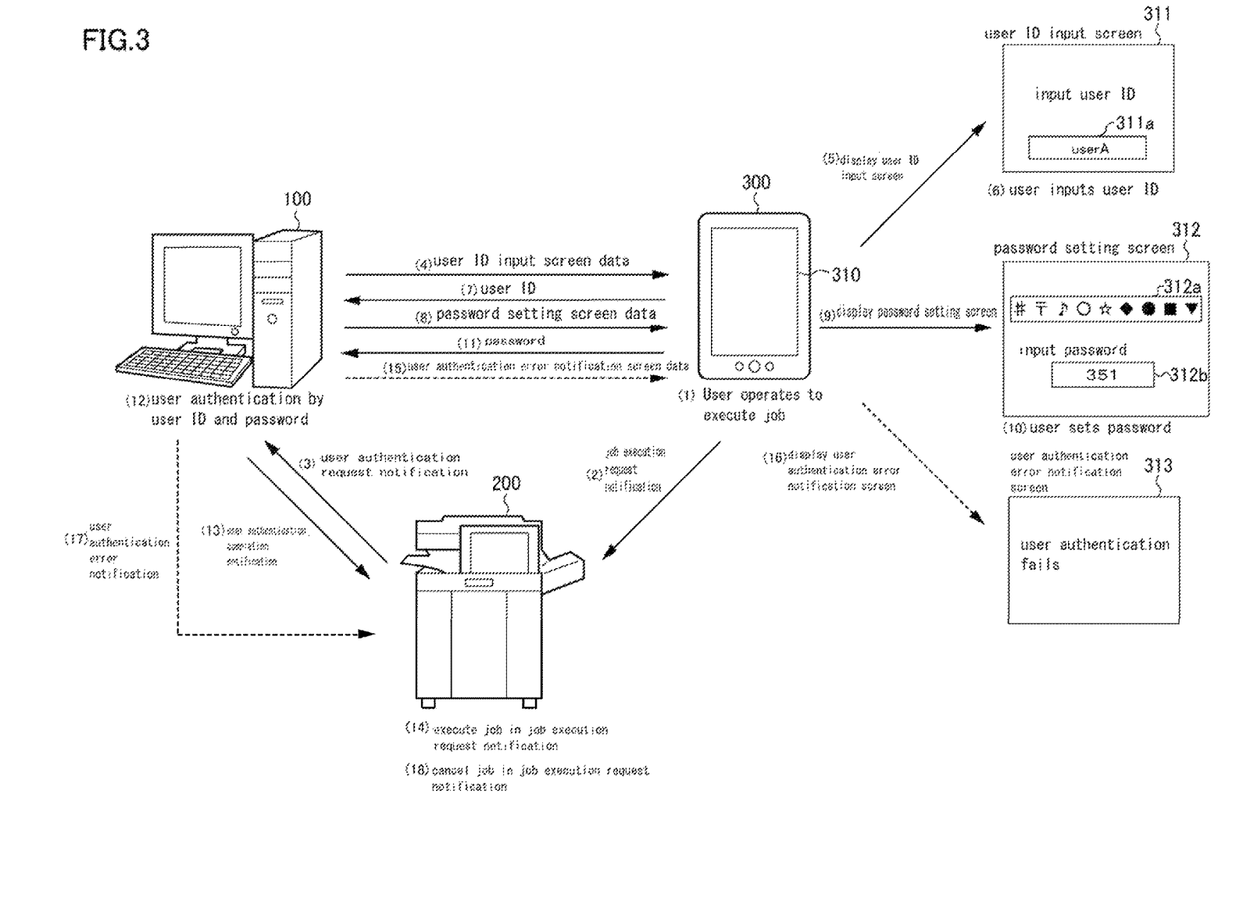
FIG. 3 shows a user authentication procedure used in the authentication system according to Embodiment 1.

Next, a user authentication procedure performed in the authentication system 10 will be described by the use of FIG. 3. In the following description, parenthesized numerals correspond to similar parenthesized numerals shown in FIG. 3.

Firstly, when the user operates the mobile terminal 300 to request the image forming apparatus 200 to execute a job as denoted by (1), the mobile terminal 300 transmits a job execution request notification that stores a job to be executed to the image forming apparatus 200 as denoted by (2).

Following this, when receiving the job execution request notification from the mobile terminal 300, the image forming apparatus 200 transmits to the authentication apparatus 100 a user authentication request notification that stores an address of the mobile terminal 300 from the job execution request notification is originated as denoted by (3).

Next, when receiving the user authentication request notification from the image forming apparatus 200, the authentication apparatus 100 transmits data for displaying and controlling the user ID input screen 311 (hereinafter, referred to as a "user ID input screen data") to the mobile terminal 300 whose address is stored in the user authentication request notification (hereinafter, referred to as a "mobile terminal") as denoted by (4).

Following this, when receiving the user ID input screen data from the authentication apparatus 100, the mobile terminal 300 displays the user ID input screen 311 as denoted by (5). A user ID input area 331a is provided on the user ID input screen 311 from which the user ID is inputted. Here, the control panel 310 is the liquid crystal panel on which the control screen is displayed where the functions that the mobile terminal 300 includes are controlled and the control requested by the user is received. The mobile terminal 300 doubles as the display circuit and the control circuit.

Next, when the user inputs the user ID from the user ID input area 311a on the user ID input screen 311 as denoted by (6), the mobile terminal 300 transmits the user ID to the authentication apparatus 100 as denoted by (7).

Following this, when receiving the user ID from the mobile terminal 300, the authentication apparatus 100 transmits data for displaying and controlling the password setting screen 312 (hereinafter, referred to as a "password setting screen data") to the mobile terminal 300 as denoted by (8).

Next, when receiving the password setting screen data from the authentication apparatus 100, the mobile terminal 300 displays the password setting screen 312 on the control panel 310 as denoted by (9). A random symbol string display area 312a and a password setting area 312b are provided on the password setting screen 312. The random symbol string display area 312a and the password setting area 312b of the password setting screen 312 will be described in detail later.

Following this, when the user sets a password from the password setting area 312b of the password setting screen 312 as denoted by (10), the mobile terminal 300 transmits the password to the authentication apparatus 100 as denoted by (11).

Next, when receiving the password, the authentication apparatus 100 performs a user authentication based on the user ID and the password as denoted by (12).

Following this, when attesting to the authenticity of the ID and the password to thereby validate the user, the authentication apparatus 100 transmits a user authentication completion notification to the image forming apparatus 200 as denoted by (13).

Next, when receiving the user authentication completion notification from the authentication apparatus 100, the image forming apparatus 200 executes a job stored in the job execution request notification transmitted from the mobile terminal 300 as denoted by (14).

Additionally, when the user cannot be validated based on the user ID and the password (that is, the user authentication fails or a user authentication error occurs), the authentication apparatus 100 transmits data for displaying a user authentication error notification screen 313 (hereinafter, referred to as "user authentication error notification screen data") to the mobile terminal 300 as denoted by (15).

Following this, when receiving the user authentication error notification screen data from the user authentication processing part 110b of the authentication apparatus 100, the mobile terminal 300 displays the user authentication error notification screen 313 on the control panel 310 of the mobile terminal 300 as denoted by (16).

Next, the user authentication processing part 110b of the authentication apparatus 100 transmits a user authentication error notification to the image forming apparatus 200 as denoted by (17).

Following this, when receiving the user authentication error notification from the authentication apparatus 100, the image forming apparatus 200 cancels the job stored in the job execution request notification transmitted from the mobile terminal 300 as denoted by (18).

Next, the random symbol string display area 312a and the password setting area 312b that are provided on the password setting screen 312 will be described by the use of FIG. 4.

The random symbol string display area 312a displays a string of random symbols in which a plurality of symbols including a reference symbol and all selection symbols of a selection sequenced symbol string are arranged at random (hereinafter, referred to as a "random symbol string").

Set in the password setting area 312b is a password that is determined based on a reference symbol that only the user memorizes, and a plurality of selection symbols and a sequence of the selection symbols that the selection sequenced symbol string includes. A password will be described that results in such a case that a reference symbol (an example in which a reference identification is indicated by reference identification information) is a "Japanese postal symbol", that a random symbol string (an example of an identification indicator) of "number sign (#)", "Japanese postal symbol (〒)", "note (♪)", "white circle (○)", "white star (☆)", "black rhombus (♦)", "black circle (●)", "black square (■)" and "black inverted triangle (▼)" is displayed in the random symbol display area 312a, and that a plurality of selection symbols (an example of a selection identification indicator) and a sequence of the selection symbols of a selection sequenced symbol string is "white star"→"black circle"→"note" as shown in FIG. 4. In this example, the selection symbol "white star" is located in a third position from the reference symbol "Japanese postal symbol" in the random symbol string shown in the random symbol string display area 312a, and therefore, a first digit of a password becomes "3". Then, the selection symbol "black circle" indicated by "→" situated at a right-hand side of the selection symbol "white star" is located in a fifth position from the reference symbol "Japanese postal symbol", and therefore, a second digit of the password becomes "5". Then, the selection symbol "note" indicated by "→" situated at a right-hand side of the selection symbol "black circle" is located in a first position from the reference symbol "Japanese postal symbol", and therefore, a third digit of the password becomes "1". Thus, a number "351" that is determined in the way described above becomes the password and is then set in the password setting area 312b.

Next, a password authentication process that is executed by the user authentication processing part 110b of the authentication apparatus 100 will be described in detail. When the network communication unit 150 receives the user authentication request notification from the image forming apparatus 200, the network communication unit 150 outputs the user authentication request notification to the control unit 110. When the user authentication request notification is inputted thereinto, the control unit 110 activates the user authentication processing part 110b. When the user authentication processing part 110b is activated, the user authentication processing part 110b starts a user authentication process. Hereinafter, the user authentication process will be described sequentially step by step by the use of a flowchart shown in FIG. 5.

Figure 5:
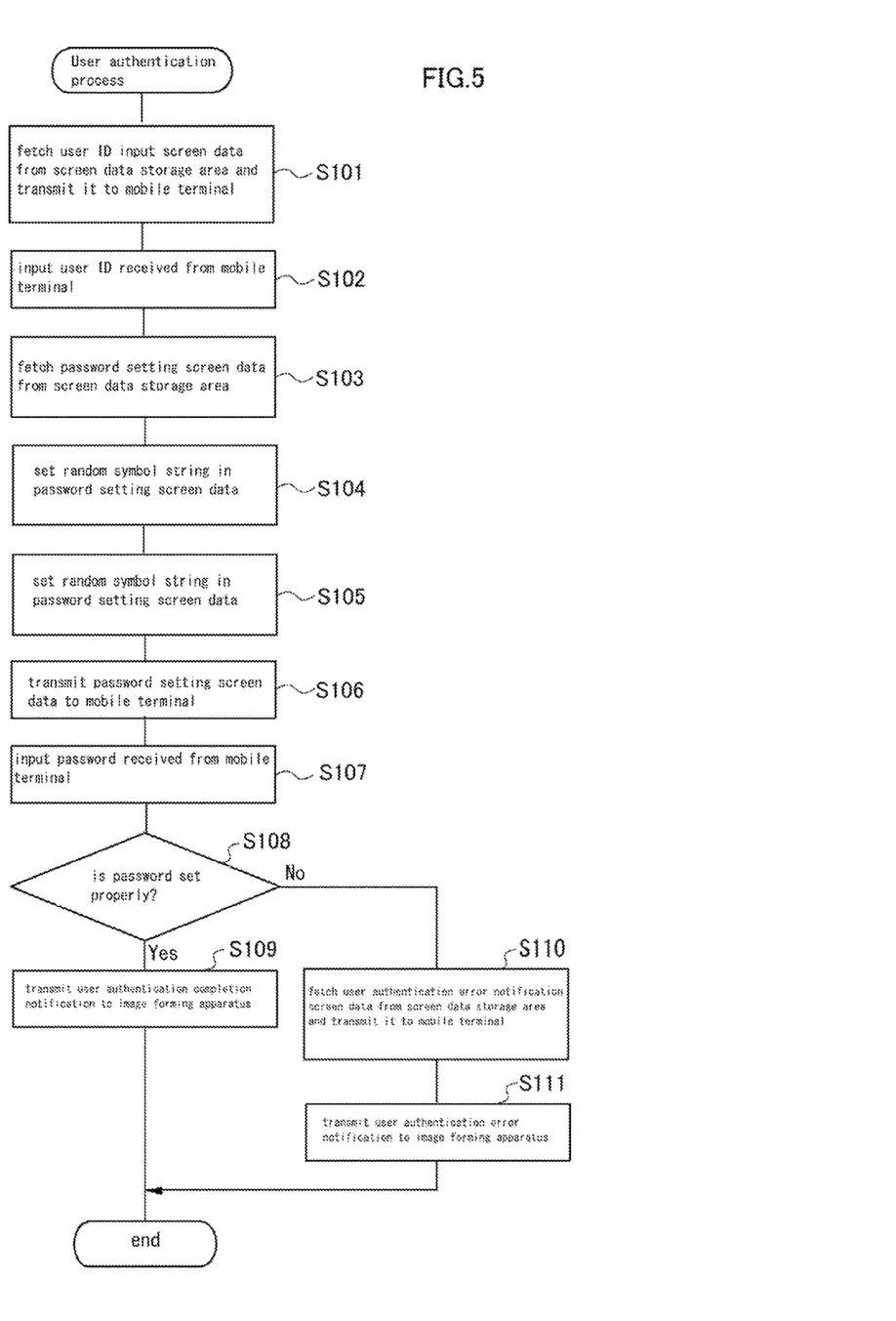
FIG. 5 shows password authenticating steps taken in the authentication apparatus according to Embodiment 1.

(Step S101)

Firstly, the user authentication processing part 110b fetches the user ID input screen data from the screen data storage area 120a, and the network communication unit 150 transmits the user ID input screen data to the mobile terminal 300.

(Step S102)

Next, the user authentication processing part 110b inputs the user ID that the network communication unit 150 receives from the mobile terminal 300.

(Step S103)

Next, the user authentication processing part 110b fetches the password setting screen data from the screen data storage area 120a.

(Step S104)

Next, the user authentication processing part 110b fetches the reference symbol and the selection sequenced symbol string that correspond to the user ID from the user information storage area 120b and generates a random symbol string that includes the reference symbol and all the selection symbols of the selection sequenced symbol string. This random symbol string should be such a symbol string that differs every time it is produced. The number of symbols in the random symbol string is determined in advance. The number of symbols of the random symbol string constitutes an upper limit of the number of symbols in the selection sequenced symbol string.

(Step S105)

Figure 4:
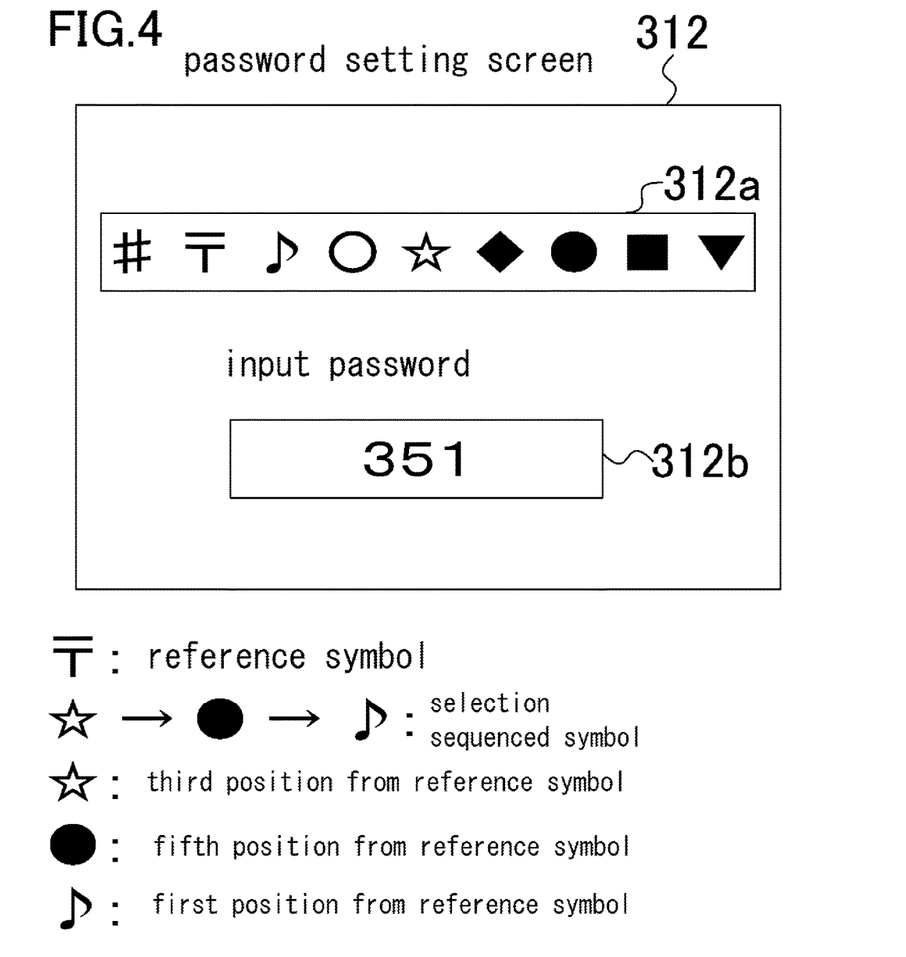
FIG. 4 shows an example of a password setting screen according to Embodiment 1.

Next, the user authentication processing part 110b sets the random symbol string in the password setting screen data so that the random symbol string is displayed in the random symbol string display area 312a of the password setting screen shown in FIG. 4.

(Step S106)

Next, the user authentication processing part 110b transmits the password setting screen data to the mobile terminal 300 by way of the network communication unit 150.

(Step s107)

Next, the user authentication processing part 110b inputs the password that the network communication unit 150 receives from the mobile terminal 300.

(Step S108)

Next, the user authentication processing part 110b determines whether or not the password is set properly from the reference symbol, the symbols of the selection sequenced symbol string and the random symbol string and the sequence of the selection symbols of the selection sequenced symbol string. If the password is set properly (YES in Step S108), the user authentication process proceeds to step S109. If the password is not set properly (No in Step S108), the user authentication process proceeds to step S110.

(Step S109)

If Yes in Step S108, the user authentication processing part 110b transmits a user authentication completion notification to the image forming apparatus 200 and ends the user authentication process.

(Step S110)

If No in Step S108, the user authentication processing part 110b fetches user authentication error notification screen data from the screen data storage area 120a and transmits the user authentication error notification screen data to the mobile terminal 300 via the network communication unit 150. This displays the user authentication error notification screen 313 on the control panel 310 of the mobile terminal 300.

(Step S111)

Next, the user authentication processing part 110b transmits a user authentication error notification to the image forming apparatus 200 and ends the user authentication process.

Next, a second embodiment for carrying out the disclosure (hereinafter, referred to as "Embodiment 2") will be described by reference to the drawings. In Embodiment 2, the reference symbol of Embodiment 1 is replaced by a reference position for determining a password from a random symbol string (hereinafter, referred to as a "reference position"). Namely, the user memorizes not the reference symbol but a reference position.

The configuration of an authentication system of Embodiment 2 is the same as the configuration of the authentication system 10 of Embodiment 1 shown in FIG. 1. In addition, a user authentication procedure of Embodiment 2 is the same as the user authentication procedure of Embodiment 1 shown in FIG. 3.

Next, a functional configuration of an authentication apparatus 100 of an authentication system 10 of Embodiment 2 will be described by the user of FIG. 2. The functional configuration of the authentication apparatus 100 of Embodiment 2 is the same as that of the authentication apparatus 100 of Embodiment 1 except for a user information storage area 120b, and therefore, the user information storage area 120b will be described.

The user information storage area 120b stores a user ID that is registered through a user information registration processing part 110a, a reference position and a selection sequenced symbol string.

Figure 6:
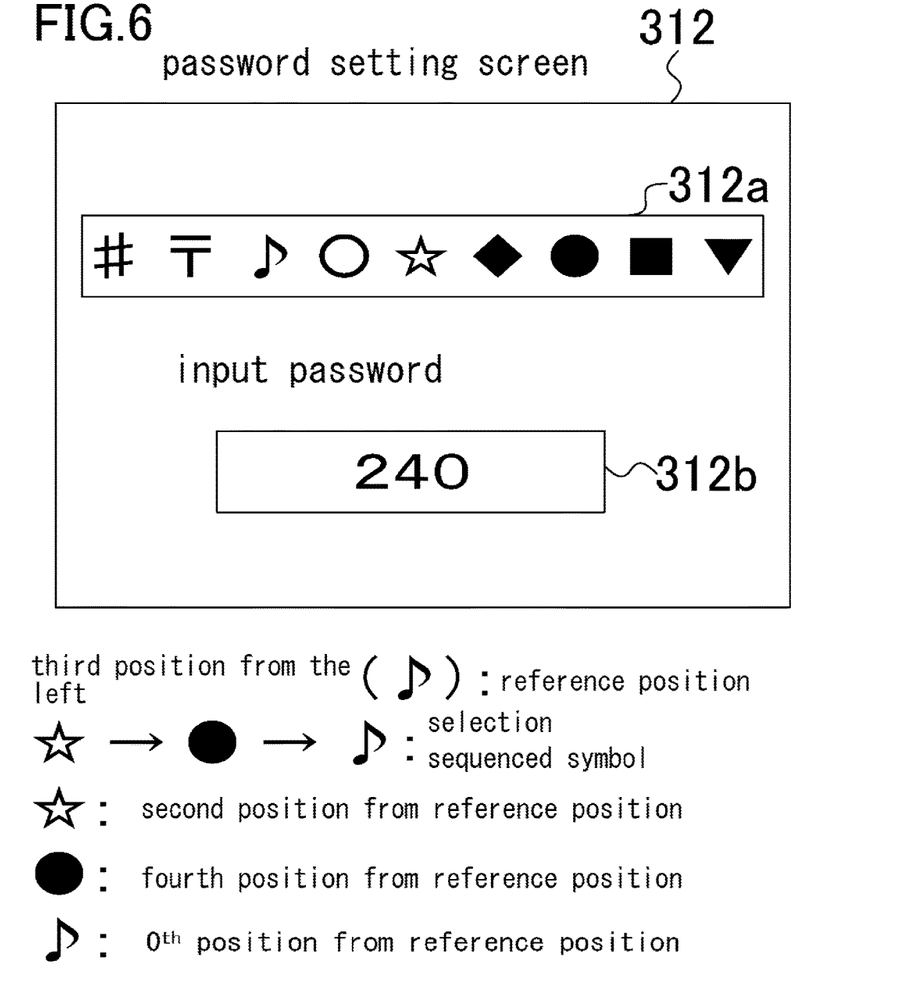
FIG. 6 shows an example of a password setting screen according to Embodiment 2.

Next, a random symbol string display area 312a and a password setting area 312b that are provided on a password setting screen 312 will be described by the use of FIG. 6.

The random symbol string display area 312a displays a random symbol string in which a plurality of symbols including all selection symbols of a selection sequenced symbol string are arranged at random.

Set in the password setting area 312b is a password that is determined based on a reference position that only the user memorizes, and the plurality of selection symbols and a sequence of the selection symbols that the selection sequenced symbol string includes. A password will be described that results in such a case that the reference position (an example in which the reference position is indicated by reference identification information) is located in a "third position from the left", that a random symbol string (an example of an identification indicator) of "number sign", "Japanese postal symbol", "note", "white circle", "white star", "black rhombus", "black circle", "black square" and "black inverted triangle" is displayed in the random symbol display area 312a, and that the plurality of selection symbols (an example of selection identification information) and a sequence of the selection symbols of the selection sequenced symbol string is "white star"→"black circle"→"note" as shown in FIG. 6. In this example, firstly, the leftmost selection symbol "white star" of the selection sequenced symbol string is located in a second position from the "note" that is located in a "third position from the left" in the random symbol string displayed on the random symbol string area 312a, and therefore, a first digit of a password becomes "2". Then, the selection symbol "black circle" indicated by "→" situated at a right-hand side of the selection symbol "white star" is located in a fourth position from the "note" that is located in the reference position, and therefore, a second digit of the password becomes "4". Then, the selection symbol "note" indicated by "→" situated at a right-hand side of the selection symbol "black circle" is the "note" located in the reference position, and therefore, a third digit of the password becomes "0". Thus, a number "240" that is determined in the way described above becomes the password and is then set in the password setting area 312b.

Next, a password authentication process that is executed by a user authentication processing part 110b of the authentication apparatus 100 will be described in detail by the use of the flowchart shown in FIG. 5. The password authentication process of Embodiment 2 is the same as that of Embodiment 1 except for Step S104 and Step S108, and therefore, Step S104 and Step S108 will be described.

(Step S104)

Next, the user authentication processing part 110*b* fetches the reference position and the selection sequenced symbol string that correspond to the user ID from the user information storage area 120*b* and generates a random symbol string that includes the symbol in the reference position and all the selection symbols of the selection sequenced symbol string. This random symbol string should be such a symbol string that differs every time it is produced. The number of symbols in the random symbol string is determined in advance. The number of symbols of the random symbol string constitutes an upper limit of the number of symbols in the selection sequenced symbol string.

(Step S108)

Next, the user authentication processing part 110*b* determines whether or not the password is set properly from the reference position, the symbols of the selection sequenced symbol string and the random symbol string and the sequence of the selection symbols of the selection sequenced symbol string. If the password is set properly (YES in Step S108), the user authentication process proceeds to step S109. If the password is not set properly (No in Step S108), the user authentication process proceeds to step S110.

Thus, in Embodiment 1 and Embodiment 2, the user determines the password from the random symbol string that is displayed, the reference symbol or the reference position that only the user memorizes, and the symbols and the sequence of the symbols of the selection sequenced symbol string, whereby a one-time password system can easily be realized. Additionally, by adopting this one-time password system, even though the password that is set in the password setting area 312*b* leaks through surreptitious glance or wire tapping, it is difficult to assume the reference symbol or the reference position and the selection sequenced symbol string from the one-time password. Thus, it is possible to provide the one-time password that is safe from surreptitious glance and wire tapping. In addition, although a general one-time password system needs exclusive authentication software for the mobile terminal 300, since the screen data of the user ID input screen 311, the password setting screen 312 and the user authentication error notification screen 313 are transmitted from the authentication apparatus 100 to the mobile terminal 300 in Embodiment 1 and Embodiment 2, the mobile terminal 300 needs no exclusive authentication software. Further, the authentication apparatus 100 and the mobile terminal 300 do not have to be synchronized in time with each other.

While the symbols are employed in Embodiment 1 and Embodiment 2, what is displayed on the control panel is not limited to the symbols described, and hence, numbers, characters, images, colors or background colors can also be displayed on the control panel. Thus, every identification indicator that the user can identify can be employed. For example, in case the reference identification indicator (the example in which the reference identification is indicated by the reference identification information) is red or the identification indicator that is located in the reference position that only the user memorizes (the example in which the reference position is indicated by the reference identification information) is red, an identification indicator string (a random identification indicator string) is displayed in which only the "black rhombus" is shown in red and the other identification indicators of "number sign", "Japanese postal symbol", "note", "white circle", "white star", "black rhombus", "black circle", "black square" and "black inverted triangle" are shown in different colors other than red and in which these identification indicators are arranged at random. Then, with the identification indicator string (the random identification indicator string) configured as described above, a password will be described that has an identification indicator string (a selection sequenced identification indicator string) having a plurality of identification indicators and a sequence of the identification indicators that is "white star"→"black circle"→"note". In this example, firstly, the symbol "white star" that is a leftmost symbol in the selection sequenced indicator string is located in a first position from the identification indicator "black rhombus" that is shown in red, and therefore, a first digit of the password becomes "1". Then, the symbol "black circle" indicated by "→" situated at a right-hand side of the symbol "white star" is located in a first position from the "black rhombus" that is shown in red, and therefore, a second digit of the password becomes "1". Then, the symbol "note" indicated by "→" situated at a right-hand side of the symbol "black circle" is located in a third position from the identification indicator "black rhombus" that is shown in red, and therefore, a third digit of the password becomes "3". Thus, a number "113" that is determined in the way described above becomes the password.

While the password is described as being made up of three digits as a result of the number of symbols in the selection sequenced symbol string being three in Embodiment 1 and Embodiment 2, the invention is not limited thereto. The number of digits of the password becomes the same as the number of symbols of the selection sequenced symbol string, and the upper limit of the number of symbols of the selection sequenced symbol string becomes the number of symbols of the random symbol string. Consequently, the number of digits of the password can be varied by varying the number of symbols of the random symbol string within the numerical range of symbols of the random symbol string.

While the user ID is described as being inputted from the user ID input screen 311 in Embodiment 1 and Embodiment 2, the invention is not limited thereto. The ID card that the user holds can also be used in place of the user ID, provided that the user can be identified by the ID card.

While the procedure of authenticating the user of the mobile terminal 300 is described in Embodiment 1 and Embodiment 2, the invention is not limited thereto. For example, in the event that a personal computer that is a PC/AT compatible one can connect to the network 500 or the internet 700, the user of the personal computer can be authenticated in the same way. Thus, the user of the mobile terminal 300 or a terminal such as a personal computer (hereinafter, referred to as a "terminal device") can be authenticated.

While the user is described as being authenticated by the authentication apparatus 100 in Embodiment 1 and Embodiment 2, the invention is not limited thereto. For example, the user information registration processing part 110*a* and the user authentication processing part 110*b*, the screen data storage area 120*a* and the user information storage area 120*b* are provided in the image forming apparatus 200, whereby the user authentication can be carried out only by the image forming apparatus 200 without installing the authentication apparatus 100.

In Embodiment 1 and Embodiment 2, when an operation needing the user authentication is performed on the mobile terminal 300, the user ID input screen 311, the password setting screen 312, and the user authentication error notification screen 313 are displayed on the control panel 310 of the mobile terminal 300. However, the invention is not limited thereto. For example, when the user carries out a user authentication directly from the authentication apparatus 100, the user ID input screen 311, the password setting screen 312 and the user authentication error notification screen 313 can also be displayed on a control panel 130 of the authentication apparatus 100.

In a typical user authentication system employing a one-time password, a one-time password is produced based on a one-time password pattern that is defined by the user himself or herself. This causes a problem that the user has to memorize the one-time password pattern that is defined by the user himself or herself. In addition, in case the same one-time password pattern is used for a long period of time, there are fears that the one-time password pattern is assumed as a result of the one-time password pattern being subjected to surreptitious glance or wire tapping a plurality of times. This requires the user to change his or her one-time password pattern periodically. This causes a problem that the user has to memorize a complex one-time password pattern every time the user changes the one-time password pattern. In an attempt to use an authentication such as a biological authentication, another problem arises that new equipment has to be installed therefor.

In contrast with this, with the authentication apparatus, the authentication method and the authentication system according to this disclosure, the one-time password system can easily be realized that can ensure the safety of the password without providing new equipment, and it is possible to prevent that the method for producing the one-time password is assumed.

Thus, while the disclosure has been described based on the specific embodiment, the embodiment described only illustrates the disclosure, and needless to say, the disclosure is not limited by the embodiment.

The authentication apparatus, the authentication method and the authentication system of this disclosure can be applied to various types of authentication apparatuses, authentication methods and authentication systems that are designed to carry out authentication.

What is claimed is:

1. An authentication apparatus comprising:
   a user information registration processing circuit that registers, for each user, user identification information, reference identification information that constitutes a reference, and a selection sequenced identification indicator string having a plurality of selection identification indicators that are selected from a plurality of identification indicators and a sequence of the selection identification indicators; and
   a user authentication processing circuit that executes a user authentication by the use of a password and the user identification information, wherein
   the user authentication processing circuit produces a random identification indicator string by arranging the plurality of identification indicators at random;
   the user authentication processing circuit calculates, for each of the selection identification indicators of the selection sequenced identification indicator string, a position value that indicates the position of the respective selection identification indicator in the random identification indicator string relative to the reference, thereby providing a plurality of position values;
   the user authentication processing circuit creates the password as a value by arranging the plurality of position values based on the order the respective selection identification indicators occur in the sequence of the selection identification indicators, thereby providing the password as a sequence of the position values;
   when a job execution requirement is received, the user authentication processing circuit verifies a user as proper based on whether the user inputs the password, thereby providing the user authentication;
   when the user authentication processing circuit verifies the user as a proper user, the authentication apparatus executes the job; and
   when the authentication apparatus is operated and the user identification information is inputted, the user authentication processing circuit executes the user authentication by the use of the inputted user identification information.

2. The authentication apparatus according to claim 1, wherein
   the reference identification information is one reference identification indicator that is selected from the plurality of identification indicators.

3. The authentication apparatus according to claim 1, wherein
   the reference identification information is a reference position of the random identification indicator string.

4. The authentication apparatus according to claim 1, comprising:
   a display circuit, wherein
   the user authentication processing circuit displays the random identification indicator string on the display circuit.

5. The authentication apparatus according to claim 4, wherein
   the user authentication processing circuit displays a user authentication error notification on the display circuit when the user authentication fails.

6. An authentication method carried out on an authentication apparatus, the method comprising:
   registering, using a user information registration processing circuit, for each user, user identification information, reference identification information that constitutes a reference, and a selection sequenced identification indicator string having a plurality of selection identification indicators that are selected from a plurality of identification indicators and a sequence of the selection identification indicators;
   producing, using a user authentication processing circuit, a random identification indicator string by arranging the plurality of identification indicators at random;
   calculating, using the user authentication processing circuit, for each of the selection identification indicators of the selection sequenced identification indicator string, a position value that indicates the position of the respective selection identification indicator in the random identification indicator string relative to the reference, thereby providing a plurality of position values;
   creating, using the user authentication processing circuit, a password as a value by arranging the plurality of position values based on the order the respective selection identification indicators occur in the sequence of the selection identification indicators, thereby providing the password as a sequence of the position values; and
   executing, using the user authentication processing circuit, a user authentication by the use of the password and the user identification information, wherein when a job execution requirement is received, the user authentication processing circuit verifies a user as proper based on whether the user inputs the password, thereby providing the user authentication;

when the user authentication processing circuit authenticates the user as a proper user, the authentication apparatus executes the job; and when the authentication apparatus is operated and the user identification information is inputted, the user authentication processing circuit executes the user authentication by the use of the inputted user identification information.

7. An authentication system having an authentication apparatus, an image forming apparatus and a terminal apparatus that are connected together via a network, wherein the authentication apparatus comprises:

a user information registration processing circuit that registers, for each user, user identification information, reference identification information that constitutes a reference, and a selection sequenced identification indicator string having a plurality of selection identification indicators that are selected from a plurality of identification indicators and a sequence of the selection identification indicators; and a user authentication processing circuit that executes a user authentication by the use of a password and the user identification information, wherein the user authentication processing circuit produces a random identification indicator string by arranging the plurality of identification indicators at random;

the user authentication processing circuit calculates, for each of the selection identification indicators of the selection sequenced identification indicator string, a position value that indicates the position of the respective selection identification indicator in the random identification indicator string relative to the reference, thereby providing a plurality of position values;

the user authentication processing circuit creates the password as a value by arranging the plurality of position values based on the order the respective selection identification indicators occur in the sequence of the selection identification indicators, thereby providing the password as a sequence of the position values;

when a job execution requirement is received, the user authentication processing circuit verifies a user as proper based on whether the user inputs the password, thereby providing the user authentication;

when the user authentication processing circuit authenticates the user as a proper user, the image forming apparatus executes the job; and when the image forming apparatus is operated from the terminal apparatus, the user authentication processing circuit of the authentication apparatus executes the user authentication by the use of the user identification information that is inputted from the terminal apparatus.

\* \* \* \* \*